United States Patent
Kraus

(10) Patent No.: US 8,113,110 B2
(45) Date of Patent: Feb. 14, 2012

(54) SQUARE BALER FOR SIMULTANEOUSLY FORMING MULTIPLE BALES

(75) Inventor: Timothy J. Kraus, Blakesburg, IA (US)

(73) Assignee: Deere & Company, Moline, IL (US)

( * ) Notice: Subject to any disclaimer, the term of this patent is extended or adjusted under 35 U.S.C. 154(b) by 247 days.

(21) Appl. No.: 12/414,810

(22) Filed: Mar. 31, 2009

(65) Prior Publication Data

US 2010/0242747 A1    Sep. 30, 2010

(51) Int. Cl.
   *A01F 15/04*    (2006.01)
   *A01F 15/10*    (2006.01)
(52) U.S. Cl. .............. 100/35; 100/3; 100/180; 100/189; 56/341
(58) Field of Classification Search .................. 100/3, 6, 100/7, 94, 96, 97, 98 R, 35, 179, 180, 184, 100/185, 188 R, 189; 56/341
See application file for complete search history.

(56) References Cited

U.S. PATENT DOCUMENTS

| | | | |
|---|---|---|---|
| 4,158,994 A * | 6/1979 | Jensen ............................. | 100/3 |
| 4,549,481 A | 10/1985 | Groeneveld et al. | |
| 4,651,512 A | 3/1987 | van der Lely | |
| 5,768,872 A * | 6/1998 | Von Allworden ................ | 56/341 |
| 6,298,646 B1 | 10/2001 | Schrag et al. | |
| 6,339,986 B1 | 1/2002 | Van Hierden | |
| 6,397,738 B1 * | 6/2002 | Brown, Jr. ......................... | 100/3 |
| 6,579,552 B1 * | 6/2003 | Myhre et al. .................. | 426/420 |
| 6,595,123 B2 | 7/2003 | Schrag et al. | |
| 6,679,042 B1 | 1/2004 | Schrag et al. | |

FOREIGN PATENT DOCUMENTS

| | | |
|---|---|---|
| DE | 19520751 | 12/1996 |
| EP | 1 411 759 | 2/2002 |
| GB | 2219967 | 12/1989 |
| WO | 03071858 | 9/2003 |

OTHER PUBLICATIONS

European Search Report, May 27, 2010, 4 Pages.

* cited by examiner

*Primary Examiner* — Jimmy T Nguyen

(57) ABSTRACT

A square baler includes a crop feed duct defining a pre-compression chamber which is curved upwardly and rearwardly from an open forward end and an inlet located across the bottom of a baling chamber. A pair of vertical partitions extend between top and bottom walls of the pre-compression chamber and divide it into three equal sized channels. Respectively located in fore-and-aft alignment with front edges of the pair of partitions is a pair of stationary knives forming part of a crop cutter arrangement including a pre-cutter rotor carrying two pairs of blades, with one of each pair cooperating with one of the stationary knives to cut incoming crop into three segments which are respectively moved into the three channels by a packer arrangement. Once the crop in the pre-compression chamber attains a preselected density, a stuffer arrangement is actuated to lift separate charges of crop from the three channels and force them into the baling chamber where they are compressed into three separate, side-by-side flakes by the baler plunger. When sufficient charges have been compressed to form three bales having a desired thickness in one embodiment, or a desired length in another embodiment, two lengths of twine are tied about each of the three bales.

3 Claims, 3 Drawing Sheets

SQUARE BALER FOR SIMULTANEOUSLY FORMING MULTIPLE BALES

FIELD OF THE INVENTION

The present invention relates to so-called square balers, and more specifically relates to a baler designed for simultaneously forming a plurality of small square bales.

BACKGROUND OF THE INVENTION

A typical bale dimension formed by known small square balers is 14"×18"×48", with the bale weighing from 70-80 lbs. and being bound by two strands of twine, white a typical bale dimension produced by a large square baler is 4'×4'×8', with the bale weighing in the neighborhood of 2000 lbs. and being bound by six strands of twine. It follows then that one drawback of producing small square bales is that the capacity is relatively low as compared to the capacity of a large square baler.

Thus, the problem to be solved is that of constructing a baler for making small square balers at a rate which is significantly increased compared to the capacity of conventional small square balers.

SUMMARY OF THE INVENTION

According to the present invention, there is provided a baler for forming small square bales, the baler having a capacity significantly greater than that of a conventional small square baler.

An object of the invention is to provide a baler for forming small square bales which has a throughput capacity comparable to that of a large square baler. This object is accomplished by modifying a large square baler having a pre-cutter and crop-delivery duct, which may or may not also serve as a pre-compression chamber, so that the baler plunger simultaneously creates multiple small square bales in the main baling chamber.

More specifically, according to a first embodiment, a large square baler for producing 4'×4'×8' bales is modified by separating the crop-delivery duct into three equal sized, transversely arranged, side-by-side channels by placing two vertical partitions spaced transversely from each other and opposite side walls of the duct. The pre-cutter includes a pair of knives located in an operative position forwardly of, and in longitudinal alignment with, the two partitions. A pre-cutter rotor includes two pairs of transversely spaced plates is provided forwardly of the pair of knives, with each pair of plates being located for sweeping paths which bring them close to opposite sides of an associated one of the pair of knives. A packer arrangement is provided for sweeping crop that has been sliced by the pair of knives into the crop-delivery duct, which here serves as a pre-compression chamber, with the crop thus being received in the three transversely arranged, side-by-side channels. A steer arrangement, is provided for sweeping pre-compressed crop from the channels into the baling chamber when the density of the crop reaches a predetermined value as determined by a density sensor arrangement. Thus, when the stuffer arrangement lifts the pre-compressed crop into the baling chamber, three charges of crop, each being 16" wide and 48' high (this dimension being the length of a formed small square bale) are placed in front of the baler plunger. When the plunger has acted to compress the charges into a plurality of flakes so as to produce a desired thickness of compressed crop, 12" for example, a bale length sensor operates to cause a tying apparatus to place two twines about each of the three 12"×16"×48' bales, which travel rearwardly through the baling chamber, noting that in an eight foot length normally occupied by one large square bale, 24 small square bales will be formed. It is possible of course to increase the bale height by using a different bale height sensor setting as the desired bale height, noting that this sensor in conventional balers and other versions of balers embodying the present invention, senses length.

It is of course possible by making the main baling chamber of different desired cross sectional dimensions to create small bales having the same size as the small bales noted above or of various other desired sizes. For example, small square bales of the same size noted above can be formed by starting with having a baling chamber which is dimensioned 48" wide and 12" high. In this embodiment, operation is the same as the first, except that the tying apparatus is not activated until the three groups of crop flakes have been compressed into a 48" length.

DESCRIPTION OF THE PREFERRED EMBODIMENT

Figure 1:
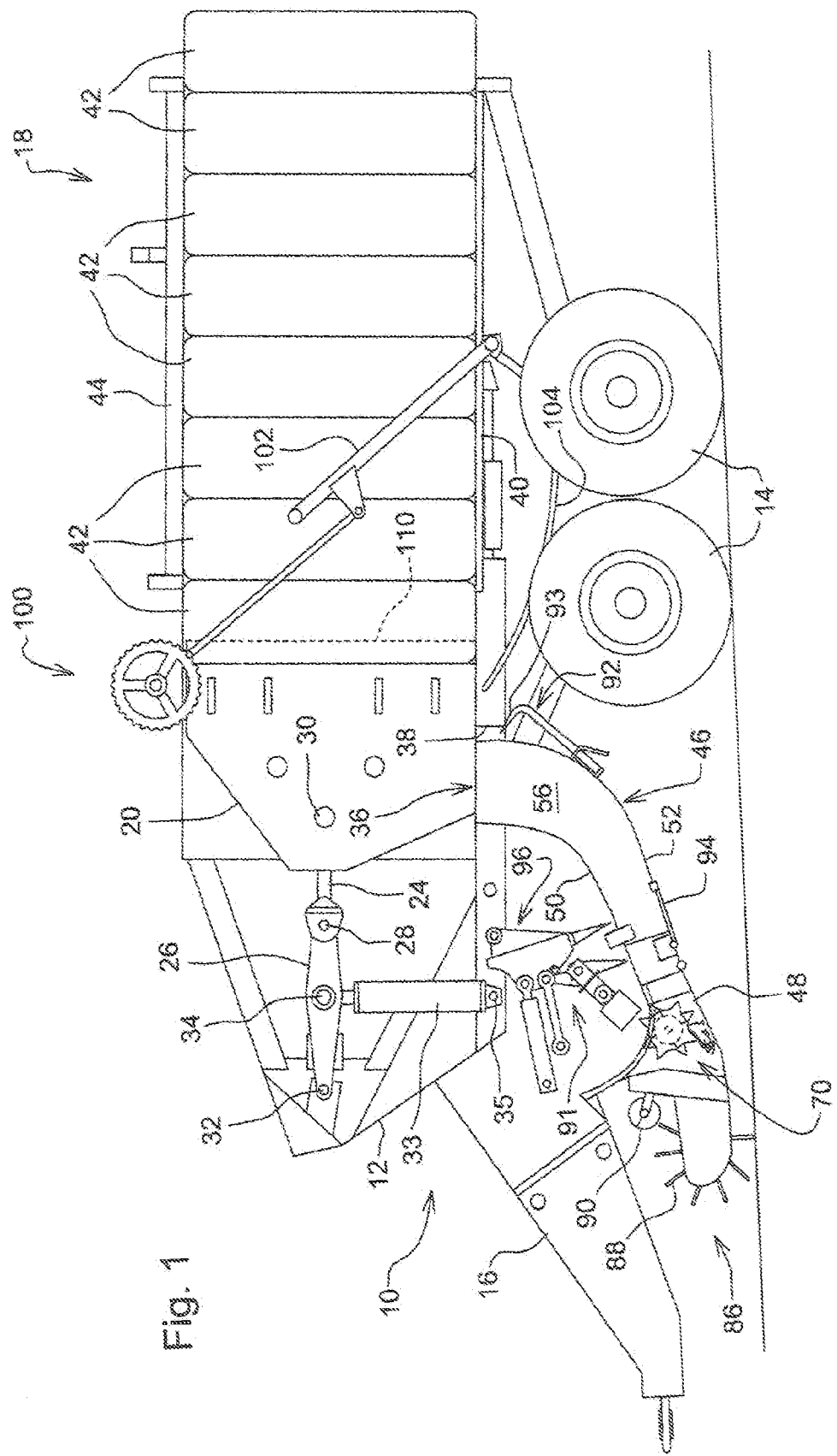
FIG. 1 is a schematic left side view of a baler configured in accordance with the present invention for simultaneously forming a plurality of small square bales within the baling chamber of which the left side is removed for revealing the plunger and formed bales.

Referring now to FIG. 1, there is shown a large rectangular baler 10 including a frame supported on a set of tandem wheels 14 for being towed over the ground by a tractor hitched to a tongue 16 fixed to, and projecting forwardly from a forward end of the frame 12.

A baling chamber 18 is supported by the frame 12 and extends fore-and-aft at a zone located above the wheels 14. The chamber 18 is here shown as having a square cross section, which could be 4'×4', for example. A plunger 20 is mounted in a forward section of the chamber 18 for being reciprocated through the action of a toggle linkage defined by first and second links 24 and 26, respectively, coupled to each other at a pivotal connection 28, with the first link 24 being pivotally coupled to the plunger at a pin 30, and with the second link 26 being coupled to the frame 12 at a pin 32. When the plunger 20 is fully extended to the rear, as shown in FIG. 1, the pins 30 and 32 are located such that they lie along a longitudinal center axis of the baling chamber 18. A hydraulic plunger cylinder 33, for toggling the links 24 and 26, is then oriented nearly vertically in a retracted condition and has its rod end pivotally coupled to the second link 26 at 34, and has its cylinder end coupled to the frame 12 at 35. Extension of the cylinder 33 will cause the link 26 to be pivoted upwardly about the pin 32 resulting in the plunger 20 being retracted to the extent that it uncovers a crop material inlet 36 extending entirely across a region forwardly of a stationary knife (not shown) provided across a forward end 38 of a bottom wall or floor 40 of the baling chamber 18 so that it cooperates with a horizontal knife arrangement (also not shown) provided at the lower rear region of the plunger for cutting off crop located within the inlet 36 when the plunger moves to the rear across the inlet during a compaction cycle.

Shown within the baling chamber 18 are a plurality of small square bales 42, formed, in a manner described below, with their length dimension extending vertically between the bottom wall 40 and a fop wall 44 of the baling chamber 18, and with their height dimension extending lengthwise of the baling chamber.

Figure 2:
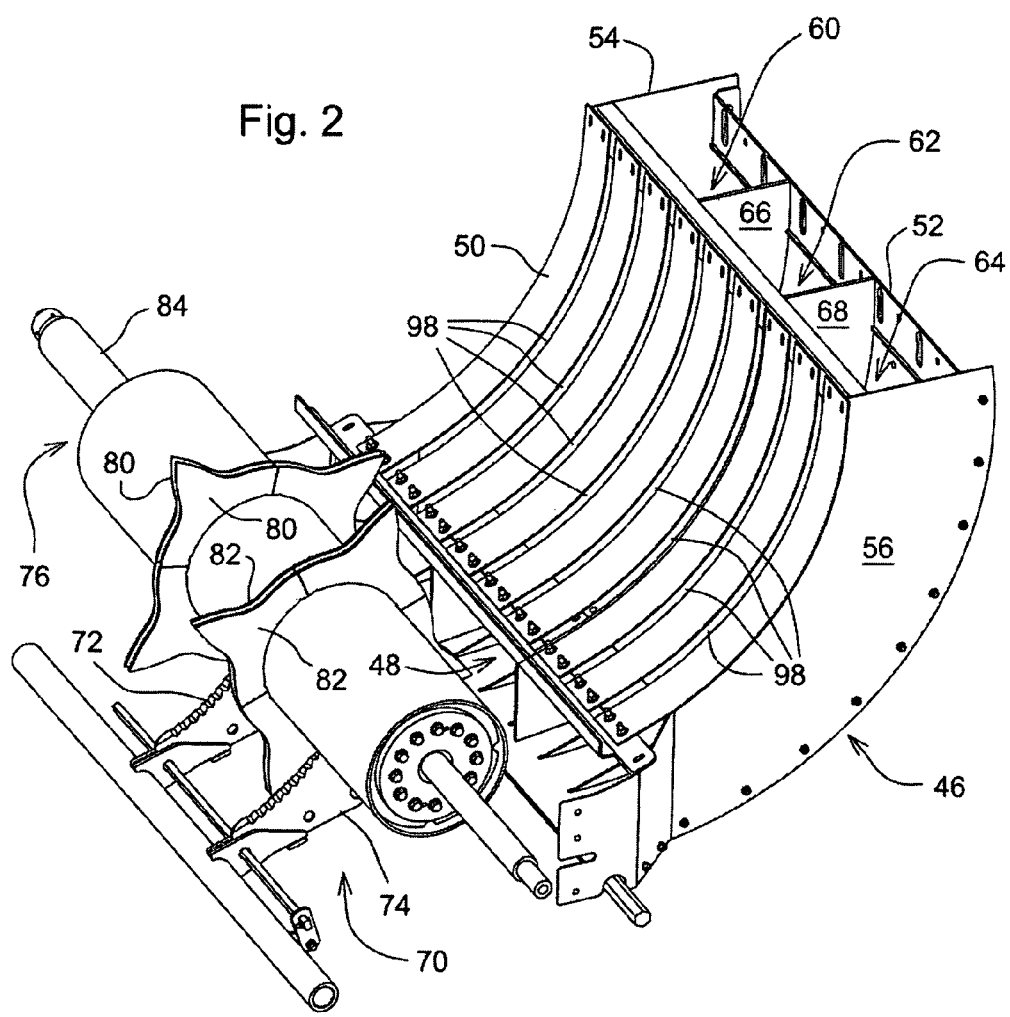
FIG. 2 is a schematic, left front perspective view of the crop-delivery duct, serving also as a pre-compression chamber, showing the two partitions that divide the duct into three channels of equal size and the cutting knife arrangement for cutting incoming crop into three segments for respectively entering the three channels.

Referring now also to FIG. 2, it can be seen that a crop-delivery duct or chute 46 is curved upwardly and rearwardly from an open forward end 48 to the baling chamber inlet 36. The duct 46 includes top and bottom walls 50 and 52, respectively, joined to right- and left-hand side walls 54 and 56, respectively. The duct 46, in this embodiment, defines a pre-compression chamber having a width equal to that of the baling chamber 18 and is divided into right-hand, middle, and left-hand channels 60, 62 and 64, respectively, of equal width, by right- and left-hand vertical partitions 66 and 68, respectively, which extend parallel to each other and to the side walls 54 and 56. The open forward end 48 of the duct 46 is located just to the rear of a crop cutter arrangement 70 including right- and left-hand vertical knives 72 and 74, respectively, located just in front of, and in fore-and-aft alignment with, front edges of the right- and left-hand partitions 66 and 68. The crop cutter arrangement 70 further includes a pre-cutter rotor 76 comprising right- and left-hand pairs of blades 80 and 82 mounted for rotating together with a horizontal transverse rotor shaft 84, with the right-hand pair of blades 80 being mounted for passing closely adjacent opposite sides of the right-hand stationary knife 72, and with the left-hand pair of blades 82 being mounted for passing closely adjacent opposite sides of the left-hand stationary knife 74. Located just forwardly of the cutter arrangement 70 for delivering crop to it is a pick-up arrangement 86 including a tined pick-up reel 88 and a centering screw conveyor 90.

A packer fork arrangement 91 is provided for receiving crop from the crop cutter arrangement 70 and feeding the crop into the pre-compression chamber defined by the duct 46. A retention arrangement 92 is pivotally mounted so that tines 93 at its upper end can be selectively moved into an upper region of the duct 46 so as to block crop from passing through the baling chamber inlet 36 while crop is being packed to a pre-selected density within the duct 46. Upon the material being compressed to the pre-selected density, a density sensor 94 located in a front region of the duct bottom wall 52 sends a signal to actuate an actuator (not shown) for withdrawing the tines 93 of the retention arrangement 92 from the duct 46 and for actuating the stuffer arrangement 96, to cause forks of the stuffer arrangement 84 to enter into longitudinal slots 98 provided in the top wall 50 of the duct 46 and sweep through the duct 46 so as to engage a pre-compressed charge of the crop material and force the charge through the baling chamber inlet 36 so that it is placed just to the rear of a rear face of the plunger 20, which is at this time retracted to the forward side of the baling chamber inlet 36. Because the duct 46 is partitioned so as to form three equal-sized channels 60, 62 and 64, three separate, transversely arranged, side-by-side crop charges are simultaneously swept up into the baling chamber 18.

Figure 3:
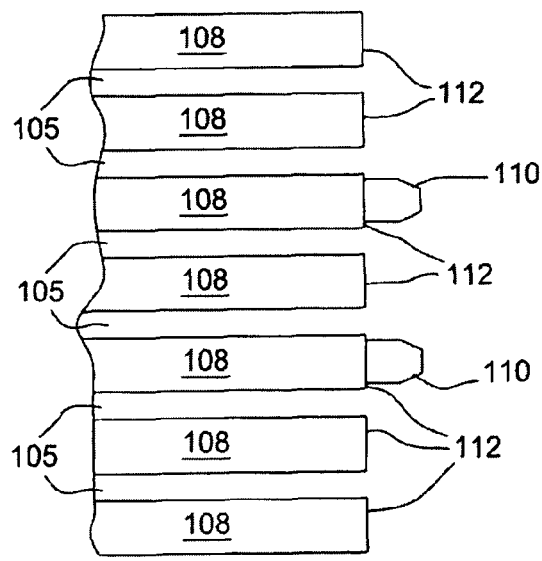
FIG. 3 is a top view of a rear region of the plunger showing charge separators fixed at the compaction face of a pair of plunger sections for defining the interface between the side-by-side charges of crop delivered to the baling chamber.
Figure 6:
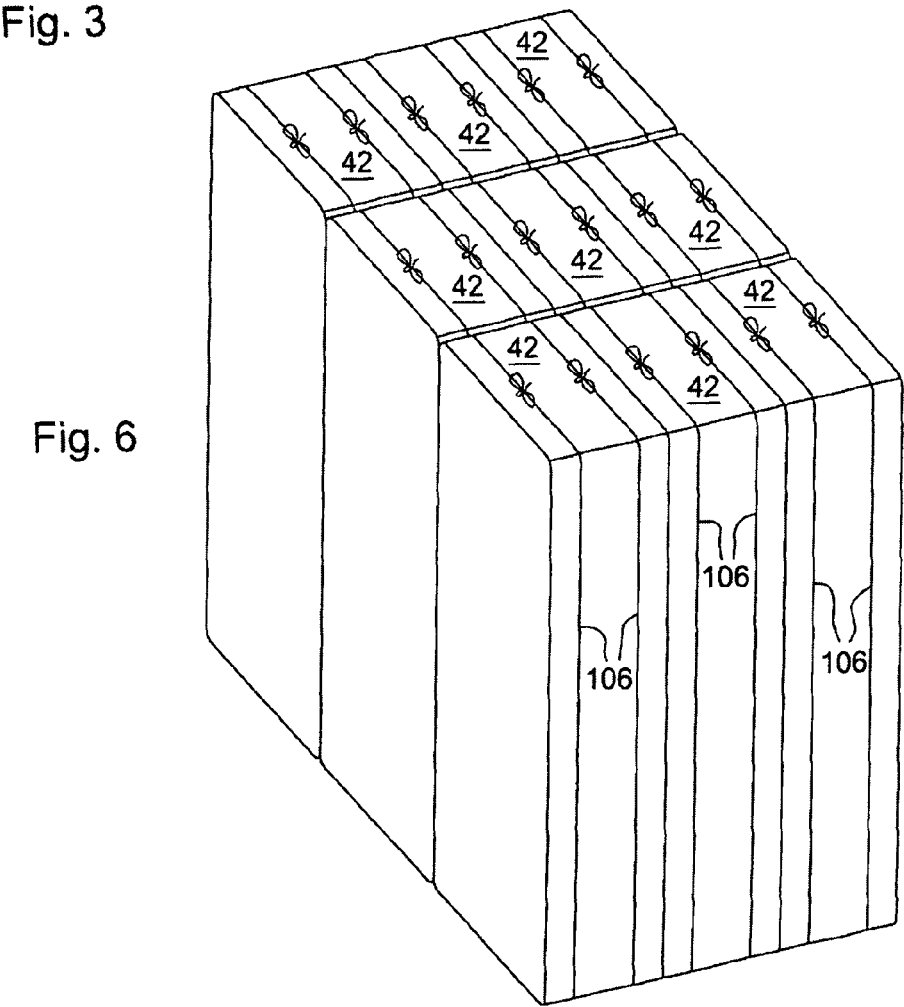
FIG. 6 is a schematic perspective view showing three sets of three formed and bound bales each as they would appear in the baling chamber.

Assuming that the baling chamber has a cross section that is 4'×4', each of the channels 60, 62 and 64 will have a width of 18". In a typical baling operation, the plunger 20 will compress each charge of crop into a flake 2" thick. After six strokes, three transversely arranged bales 66 dimensioned 16"×12"×48" will be formed. A bale thickness measuring device, such as a toothed wheel (not shown) conventionally used to measure length, can be provided on the baling chamber 18 and rotated by the rearwardly advancing bale for measuring the height of the bale being formed. When a desired dimension has been measured, the height sensor causes a tying mechanism 100, partially shown in FIG. 1, to be actuated so as to cause a yoke 102 carrying six twine-delivery needles 104 to be pivoted so that the needles 104 travel upwardly through slots provided in a forward region of the bottom of the baling chamber 18 and then through slots 105, defined between seven upright, transversely spaced plunger sections 108 (see FIG. 3), and deliver twine to respective knotters (not shown) of the tying mechanism 100 so as to secure two lengths of twine 106 about each of the three bales 42, as shown in FIG. 6. Thus, groups of three transversely arranged, side-by-side formed bales 42 move rearwardly in the baling chamber 18 until they exit the baling chamber, where they can be accumulated on a bale accumulator (not shown) towed by the baler 10, or they can be deposited directly on the ground for being picked up later.

In order to prevent the interfaces of the three side-by-side charge portions of crop from becoming comingled during formation of the side-by-side bales, a charge separator 110 is fixed to a compaction face 112 of each of the two plunger sections 108 respectively located in alignment with the interface between the opposite sides of the respective crop charges conveyed to the chamber 18 from the middle channel 60 and from the right and left side channels 62 and 64. Each charge separator 110 is in the form of a vertical rectangular bar having a tapered rear portion which separates and deflects comingled crop at the adjacent charge interface to the opposite sides of the separator 110 as it moves rearwardly during a compaction stroke of the plunger 20. The fore-and-aft dimension of each separator 110 is approximately equal to the thickness of a flake of crop that is produced from each charge portion so that a complete separation of the side-by-side formed flakes occurs.

Figure 4:
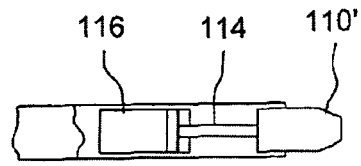
FIG. 4 is a top view of a forward region of one of the plunger sections showing a second embodiment of the charge separator which is coupled to a hydraulic cylinder shown extended with the charge separator protruded beyond the compaction face of the plunger section.
Figure 5:
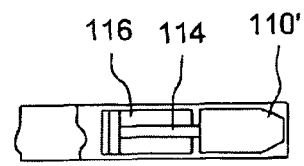
FIG. 5 is a view like that of FIG. 4 but showing the actuator retracted with the charge separator being retracted into the plunger section.

In some installations, it may be desirable to retract the separators within the confines of the associated plunger section 108 so that the separators do not project beyond the compaction faces 112 of the plunger sections when the plunger 20 is refracted, for example. Referring to FIGS. 4 and 5, there is shown a separator 110' secured to a rear end of a piston rod 114 of an extensible and retractable actuator 116, which is shown extended in FIG. 4 so as to dispose the separator 110' in a rearwardly extended working position, and which is shown retracted in FIG. 5 so as to dispose the separator 110' in a non-working position wherein it is retracted within the plunger section 108. Actuation of the actuator 116 is preferably automatically carried out in concert with the operation of the plunger actuator 33 so that when the actuator 33 contracts to move the plunger 20 rearwardly in the chamber 18 the actuator 116 will extend to extend the separator 110. Conversely, when the plunger actuator 33 extends so as to move the plunger 33 forwardly of the baling chamber inlet 36, the actuator 116 is retracted so as to retract the separator 110 within the associated plunger section 108.

Baler embodiments having baling chambers of other cross sections could be used. For example, a baling chamber which is only 12" high could be provided for making small square bales having the same size as the bales 42. In this embodiment the bale length would extend lengthwise within the baling chamber with the bale length measuring wheel being operated to effect tying of the bale after registering a length of 4'. In any event, no matter what size of small bale is desired the number of side-by-side channels $C_n$, and, hence, the number of bales that are simultaneously formed would be equal to the number of partitions $P_n+1$.

Further, it should be noted that with some baler embodiments it may be possible to effectively feed crop into the crop-conveying duct without using a packer arrangement, with the compaction of the charges of crop into flakes by the plunger creating bales of adequate density. For example, the feeding of crop into the crop conveying duct of some arrangements could effectively be accomplished by the cutter blades, especially if they are shaped for more aggressively moving the crop.

Having described the preferred embodiment, it will become apparent that various modifications can be made without departing from the scope of the invention as defined in the accompanying claims.

The invention claimed is:

1. A method of forming a plurality of transversely arranged, side-by-side bales within a baling chamber of a large square baler, comprising the steps of:
   a. continuously accumulating crop to be baled;
   b. dividing the accumulated crop into a plurality of separate, transversely arranged, side-by-side portions so as to define a plurality of transversely arranged, side-by-side charges, wherein said plurality of side-by-side charges are arranged side-by-side in a direction transverse to a pressing direction of a plunger;
   c. simultaneously moving said plurality of side-by-side charges into said baling chamber;
   d. simultaneously compressing said plurality of side-by-side charges into flakes;
   e. repeating steps ad until said flakes accumulate to have a pre-selected fore-and-aft dimension within said baling chamber, thereby forming a plurality of transversely arranged, side-by-side completed bales, wherein said plurality of transversely arranged, side-by-side completed bales are arranged side-by-side across a width of the baling chamber; and
   f. simultaneously binding said plurality of side-by-side completed bales.

2. The method of forming a plurality of transversely arranged, side-by-side bales, as defined in claim 1, and further including a step of pre-compressing the plurality of side-by-side charges prior to step c.

3. The method of forming a plurality of transversely arranged, side-by-side bales, as defined in claim 1, and further including a step of simultaneously separating said side-by-side charges from each other while performing step d.

* * * * *